United States Patent [19]

Crumrine

[11] 4,150,725

[45] Apr. 24, 1979

[54] IMPLEMENT WITH COMPENSATION FOR TERRAIN IRREGULARITIES

[75] Inventor: John C. Crumrine, Cawker City, Kans.

[73] Assignee: Richardson Manufacturing Company, Inc., Cawker City, Kans.

[21] Appl. No.: 704,070

[22] Filed: Jul. 6, 1976

[51] Int. Cl.² .......................................... A01B 59/042
[52] U.S. Cl. .................................... 172/678; 172/311; 172/421; 280/489
[58] Field of Search ............... 172/239, 240, 311, 413, 172/421, 445, 456, 678, 328, 396, 400, 401; 280/483, 486, 487, 43.23, 484, 485, 488, 489; 267/69, 70, 170, 177, 136, 137, 138

[56] References Cited

U.S. PATENT DOCUMENTS

| | | | |
|---|---|---|---|
| 187,410 | 2/1877 | Otto et al. | 267/70 |
| 1,375,626 | 4/1921 | Carpenter | 172/421 |
| 1,606,379 | 11/1926 | Osterman | 280/486 |
| 2,691,930 | 10/1954 | Forgy | 172/328 |
| 2,701,993 | 2/1955 | Allison | 280/43.23 |
| 2,939,539 | 6/1960 | Kramer | 172/396 |
| 3,033,296 | 5/1962 | Kaufman et al. | 172/421 X |
| 3,365,003 | 1/1968 | Woodworth | 172/678 |
| 3,759,332 | 9/1973 | Robertson, Sr. | 172/239 |
| 4,018,452 | 4/1977 | Wagatsuma et al. | 267/138 X |

Primary Examiner—Richard T. Stouffer
Attorney, Agent, or Firm—D. A. N. Chase

[57] ABSTRACT

An agricultural implement such as a disc or treader is provided with a counterpoise connection between the frame of the implement and the tongue for holding the tongue in a normal operative position. The counterpoise employs a spring-loaded compensator link of normally fixed length which prevents relative movement of the tongue and frame under the reaction forces against the tillage tools produced by the resistance of the soil, but the springs permit the length of the link to change to allow the tongue to self-adjust in response to the higher forces against the tongue encountered when uneven terrain is traversed. The design provides for the use of a selected number of springs in a symmetrical cluster with each spring being employed in both the extension and shortening of the link. The illustrated embodiment is a double offset disc wherein the front gangs of discs cut a furrow in the soil in which the center transport wheels of the implement are forced to run. These support wheels are variable in angular displacement about a rockshaft so that the wheels may be independently adjusted to a lower running level than the outside transport wheels to compensate for the furrow and maintain the frame in a stable transverse attitude.

4 Claims, 12 Drawing Figures

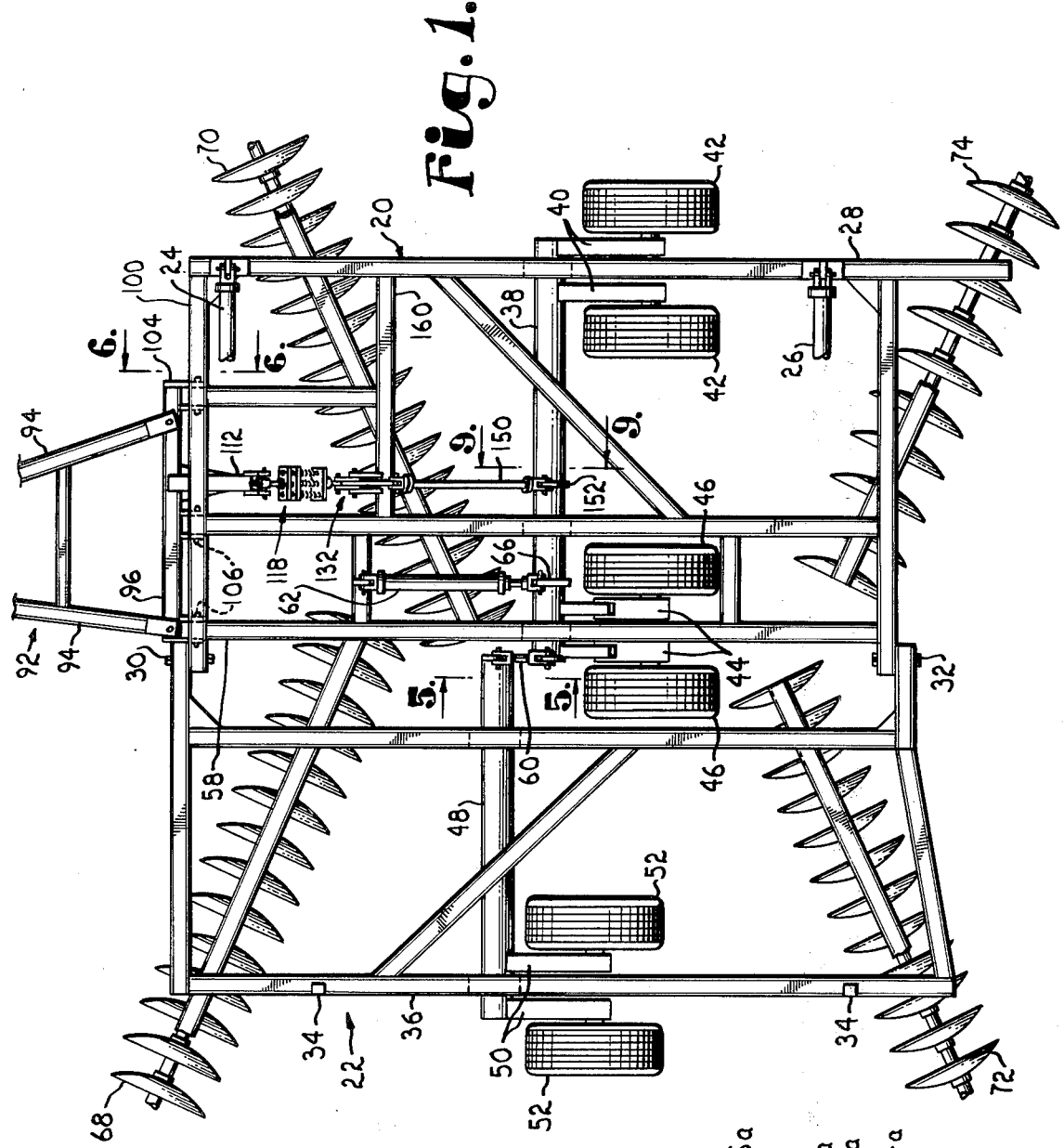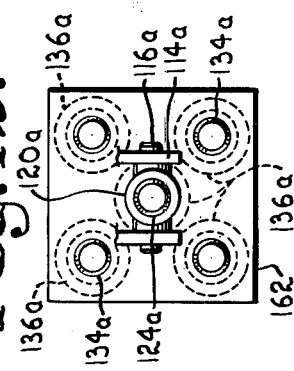

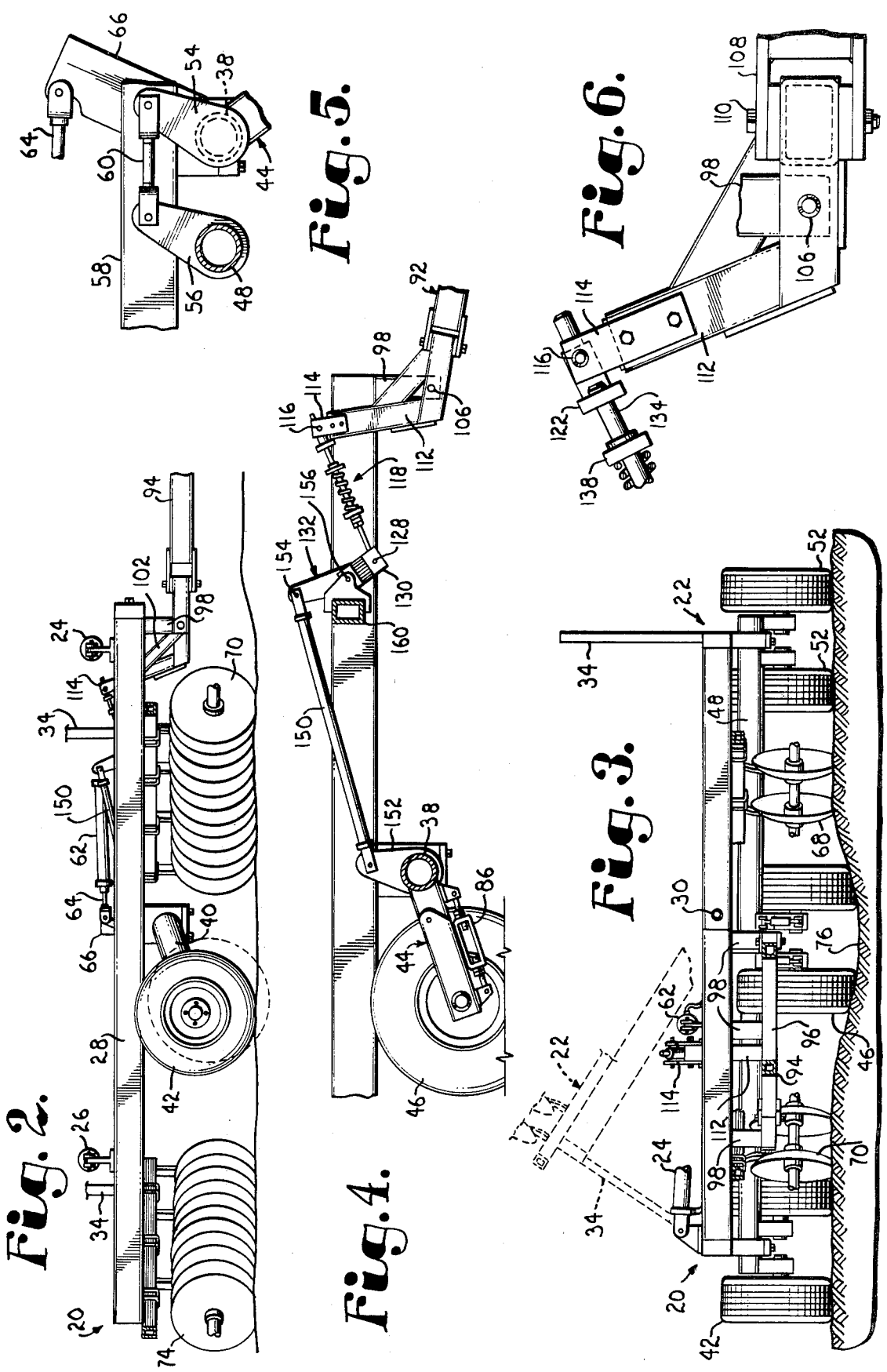

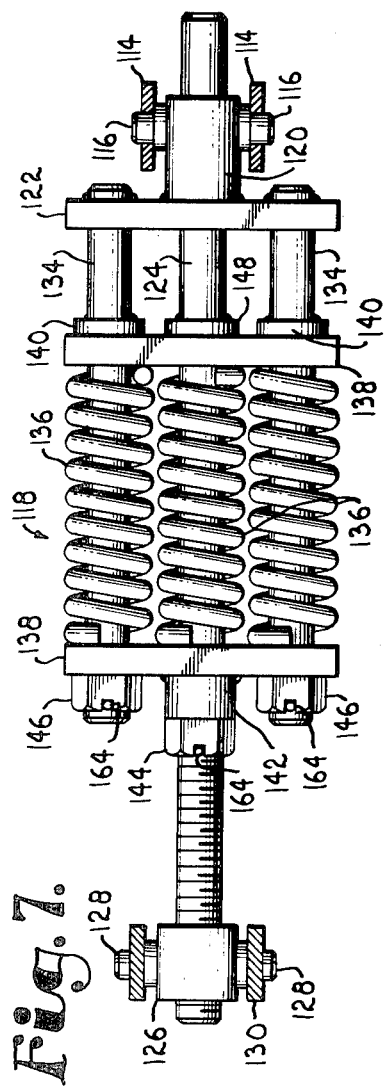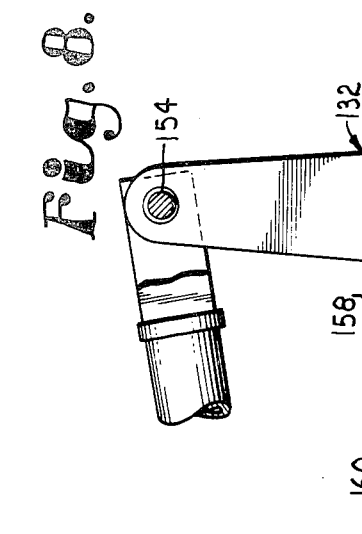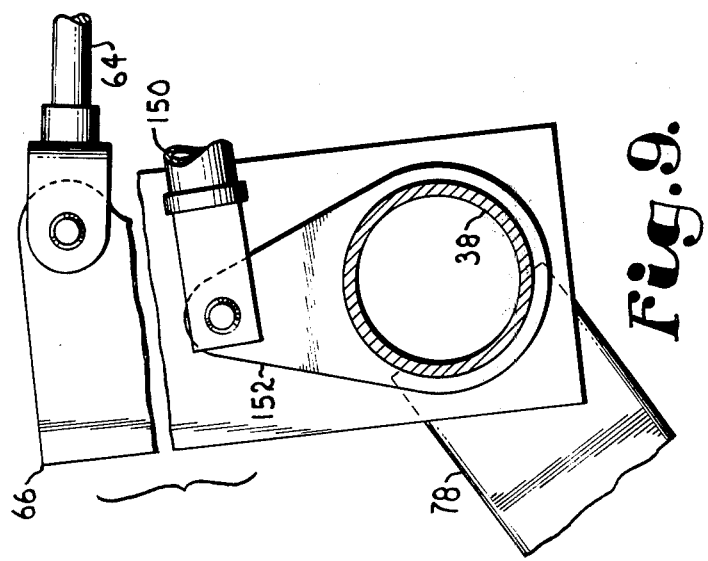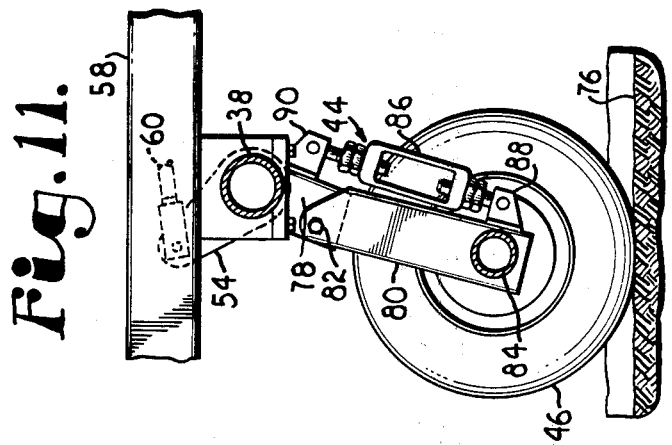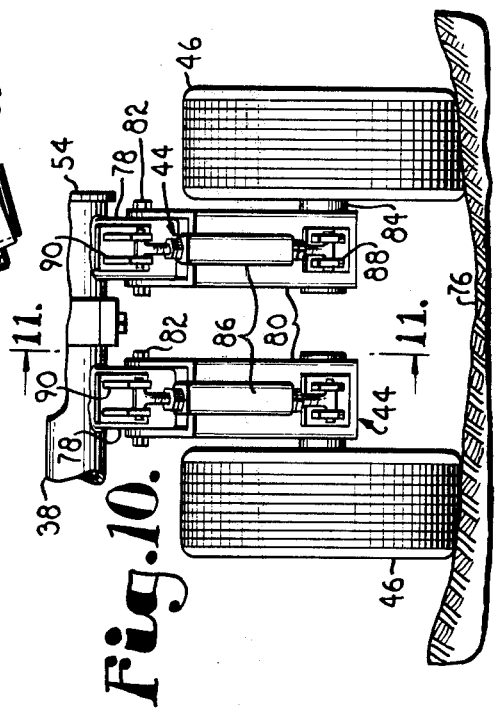

IMPLEMENT WITH COMPENSATION FOR TERRAIN IRREGULARITIES

This invention relates to improvements in agricultural implements such as discs and treaders and, more particularly, to apparatus for compensating for both front-to-rear and side-to-side terrain irregularities.

Implements such as offset discs, double offset discs, and mulch treaders commonly employ a wheeled frame from which a tongue extends to connect the implement to the drawbar of a tractor. The tongue is pivoted on the frame about a transverse horizontal axis spaced in front of the transport wheels of the implement. Accordingly, since the line of draft of the implement is spaced above the ground, the reaction forces against the tillage tools produced by the resistance of the soil create a couple which tends to cause the implement to nose dive. For this reason, it is conventional practice to employ a counterpoise connection between the tongue and the frame so that these reaction forces are transferred to the tractor drawbar and the implement is thus held in a level attitude.

However, the counterpoise connection cannot be a rigid link since the tractor and drawn implement must at times traverse uneven terrain such as when the tractor encounters a berm. In such instances, the tongue must be permitted to pivot so that its forward end (at the tractor drawbar) is raised or lowered until such time that the tractor and implement again are both on essentially even ground. The usual approach is to provide the counterpoise with compensating springs which are sufficiently heavy to resist the reaction forces against the tillage tools produced by the resistance of the soil, but which yield when terrain irregularities are encountered to permit the tongue and frame to undergo relative movement to temporarily change the position of the tongue. One common design in widespread use employs a pair of springs, each of which operates singly as the tongue position changes in a given direction. Although this arrangement is satisfactory, it suffers from the disadvantage that only one of the two available springs is used in a given correction. As the size and weight of both implements and tractors increases with modern development of agricultural machinery, the need for a more efficient and versatile compensator of this type has arisen.

Furthermore, side-to-side terrain irregularities may be encountered in certain implement configurations as well as the front-to-rear irregularity discussed above. Particularly in double offset discs, the front pair of gangs cuts a furrow in the soil which is not filled until the rear gangs pass. It is necessary to locate the transport wheels between the front and rear gangs and oftentimes at least one of the wheels is forced to run in the furrow.

The conventional elevational adjustment for the implement frame (which controls the soil depth of the discs) employs a hydraulically operated rockshaft from which the wheel support legs extend. The rockshaft is rotated to the desired position (frame elevation) and held by the hydraulic mechanism, but all of the wheels are maintained at the same running levels. Accordingly, the presence of one wheel or a set of wheels at the edge of the furrow or in the bottom of the furrow creates an unstable condition and causes the discs to operate at uneven depths.

It is, therefore, an important object of the present invention to provide a counterpoise connection for agricultural implements in which the compensating spring or springs are employed in both the lengthening and the shortening of the counterpoise link as the tongue is permitted to move up or down relative to the frame when uneven terrain is encountered.

Another important object of this invention is to provide a counterpoise as aforesaid in which force range selection is possible by the choice of the number of springs used.

Still another important object is to provide a counterpoise as aforesaid that is relatively compact and that utilizes multiple springs in a symmetrical cluster to provide a versatile design in which a compact configuration may be maintained even with a large number of springs.

Furthermore, it is an important object of the present invention to provide a means of independently adjusting the wheel or wheels of an agricultural implement that are forced to run in a furrow, thereby maintaining the structure in a stable transverse attitude.

As a corollary to the immediately preceding object, it is an important aim of this invention to provide a wheel support leg of variable length to enable the wheel carried thereby to be set at a running level different from the other transport wheels of the implement.

In the drawings:

FIG. 1 is a fragmentary, top plan view of a double offset disc incorporating the improvements of the present invention;

FIG. 2 is a side elevational view of the implement shown in FIG. 1, the outer end portions of the gangs of discs being broken away for clarity;

FIG. 3 is a front elevational view of the implement shown in FIG. 1 with parts broken away for clarity, the folded position of the wing frame being illustrated in broken lines and the transverse soil profile being shown to illustrate the lower running levels of the center wheels;

FIG. 4 is a fragmentary, side elevational view (partially schematic) on an enlarged scale, taken from the same side as FIG. 2 and illustrating the linkage that interconnects the main rockshaft and the counterpoise;

FIG. 5 is an enlarged, fragmentary, cross-sectional view taken along line 5—5 of FIG. 1;

FIG. 6 is an enlarged, fragmentary, cross-sectional view taken along line 6—6 of FIG. 1;

FIG. 7 is a plan view of the compensator assembly of the counterpoise;

FIG. 8 is an enlarged, side elevational view of the lever that secures the rear end of the compensator assembly to the frame and actuates the counterpoise in accordance with the selected frame elevation;

FIG. 9 is an enlarged, fragmentary, cross-sectional view taken along line 9—9 of FIG. 1 with parts broken away for clarity;

FIG. 10 is an enlarged, fragmentary, front view of the center transport wheels in the furrow cut by the front gangs;

FIG. 11 is a cross-sectional view taken along line 11—11 of FIG. 10; and

FIG. 12 is an end view of a modified form of compensator assembly having five springs arranged in a symmetrical cluster.

Referring initially to FIGS. 1–3, a double offset disc implement is shown having a main frame 20 and a wing frame 22. The implement folds hydraulically as illustrated in FIG. 3 where the wing frame 22 is shown in broken lines. This is accomplished by a pair of front and rear hydraulic cylinders 24 and 26 anchored to the outside longitudinal member 28 of the main frame 20. The folding action occurs along a fore-and-aft axis defined by pins 30 and 32 at the front and rear, respectively, of the frame structure which pivotally mount the wing frame 22 on the main frame 20. The hydraulic cylinders 24 and 26 are shown fragmentarily for clarity, it being understood that the piston rods of such cylinders are connected to the wing frame 22. A pair of posts 34 on the outside longitudinal member 36 of the wing frame 22 substantially invert and bear against the frame member 28 when the implement is folded in order to stabilize the wing frame 22. The folding feature is conventional in implements of this type in order to enable the structure to accommodate roadway widths when the implement is towed from one field site to another.

A rockshaft 38 is journaled on the main frame 20 and extends transversely therebeneath at approximately the longitudinal center of the implement. A pair of legs 40 extend radially outwardly from rockshaft 38 at its outer end and support a pair of transport wheels 42. A pair of adjustable legs 44 extend radially outwardly from the rockshaft 38 at its inner end and support a pair of transport wheels 46 located at substantially the transverse center of the implement. Similarly, a wing rockshaft 48 is journaled on the wing frame 22 and extends transversely therebeneath, the outer end thereof being provided with a pair of legs 50 on which a pair of transport wheels 52 are mounted. Though axially out of alignment, the two rockshafts 38 and 48 are at the same level with respect to the frame structure. Also, the distances from the axles of the outside wheels 42 and 52 to the axes of the respective rockshafts are equal; therefore, the wheels 42 and 52 run at the same level as set by the positions of the rockshafts.

In order that the two rockshafts 38 and 48 will operate together through equal angular displacements, a pair of crank arms 54 and 56 are fixed to the inner ends of the rockshafts 38 and 48 respectively (see FIG. 5). The inner end of the rockshaft 38 extends just beyond the normally inside longitudinal member 58 of main frame 20 (compare FIGS. 1 and 5). A drag link 60 interconnects the arms 54 and 56 and is attached to each with a ball joint connection (not shown in detail) to permit the two frames to fold for road transport as discussed above. The rockshafts are actuated by a hydraulic piston and cylinder assembly 62 having a piston rod 64 connected to rockshaft 38 by a crank arm 66.

The double offset disc illustrated herein has a pair of front gangs 68 and 70 and a pair of rear gangs 72 and 74. As is especially evident in FIG. 1, the front gangs of discs 68 and 70 are swept forward whereas the rear gangs 72 and 74 are swept back, i.e., each gang is set forwardly or rearwardly at an angle rather than being perpendicular to the line of draft of the implement. The arrangement is such that the discs at the inner ends of the front gangs 68 and 70 cut a furrow 76 in the ground as the implement is advanced (see FIGS. 3, 10 and 11). The furrow 76 is not filled with soil until the rear gangs 72 and 74 pass; therefore, the center transport wheels 46 are forced to run in the furrow 76.

The adjustable legs 44 for the center wheels 46 are best illustrated in FIGS. 10 and 11. Each leg 44 has a stub section 78 welded to the rockshaft 38, and an outer, shank section 80 secured to the stub section 78 by a pivot bolt 82. The axle 84 of the wheel 46 is carried by the shank section 80 adjacent its outer end. A turnbuckle 86 is pivotally connected to a pair of ears 88 adjacent such outer end of the shank section 80 and a pair of ears 90 on the stub section 78. Accordingly, the angular position of axle 84 relative to rockshaft 38 can be varied by the turnbuckle 86 which sets the relative positions of the two leg sections with respect to the axis of pivot bolt 82. Since the other legs 40 and 50 supporting the outer wheels 42 and 52 are fixed at the same relative angular positions to maintain these wheels at the same running level, the angularly variable legs 44 permit the center wheels 46 to run at a different level.

Now referring in particular to FIGS. 1–3 and 6, the implement is drawn by the usual tongue 92 having a pair of hitch arms 94, the rear ends thereof being pinned to a transversely extending tongue support beam 96. Three mounting fingers 98 depend from the front transverse member 100 of the main frame 20 and are braced by diagonal members 102. The beam 96 is provided with a pair of rearwardly projecting ears 104 at each of its ends and approximate center, each of such pair of ears receiving a corresponding finger 98 and being secured thereto by a pivot pin 106. A horizontal, transverse axis is defined by the three pins 106, and it is about this axis that the frame structure of the implement and the tongue 92 would be freely relatively movable were it not for the counterpoise connection of the present invention to be described hereinbelow. It should be noted that the horizontal axis defined by the pins 106 is adjacent the lower ends of the mounting fingers 98 in order to lower the line of draft as much as possible.

The rear ends of each of the hitch arms 94 present a clevis 108 joined to the beam 96 by a bolt 110 whose axis is generally vertically oriented. The hitch arms 94 converge to a nose at the front of the tongue 92 which is connected to the draw bar of the tractor (not shown) in the usual manner. An elbow member 112 is rigid with the beam 96 between the hitch arms 94 and extends rearwardly and upwardly at an angle to its terminal end presented by a pair of spaced plates 114 apertured to receive trunnions 116 at the forward end of a compensator assembly broadly denoted 118 and shown in detail in FIG. 7.

The trunnions 116 project from a sleeve 120 which is welded to a rectangular plate 122 that is apertured so that an open bore is provided through the sleeve 120 to receive the forward end portion of a central guide rod 124 extending longitudinally of the assembly 118. The opposite, rear end portion of guide rod 124 is threaded and is received by an internally threaded sleeve 126 provided with trunnions 128 that form a pivotal connection with the bifurcated lower end 103 of a dog leg lever 132 (FIG. 8). A pair of shorter guide rods 134 are disposed on opposite sides of central rod 124 and are equally spaced therefrom, the forward ends of such rods 134 being welded to plate 122.

Three coil springs 136 are telescoped over rods 124 and 134 and are sandwiched between a pair of rectangular bearing plates 138 through which the rods extend. The springs 136 are in compression between the bearing plates 138, and the rear plate 138 (on the left as viewed in FIG. 7) is held against movement toward sleeve 126 whereas the front plate 138 (on the right as viewed in FIG. 7) is held against movement toward sleeve 120. The latter is accomplished by a pair of collars 140 welded on respective rods 134 in equally spaced relationship to plate 122. The rear bearing plate 138 is provided with a collar 142 which is held by a nut 144 on the threaded end portion of the central rod 124. The rear ends of the short rods 134 are threaded and have nuts 146 thereon which are normally flush against rear plate 138, and central rod 124 is provided with a collar 148 that is normally flush against front plate 138.

In FIGS. 4 and 9 it may be seen that one end of an operating rod 150 is pivotally connected to a crank arm 152 on rockshaft 38, the opposite end thereof being pivotally connected at 154 to the upper end of lever 132 (FIG. 8). A central fulcrum 156 for lever 132 is provided by a clevis and pin connection in which the clevis elements 158 are rigid with a transverse member 160 forming a part of main frame 20 and located immediately behind the front frame member 100.

A modified form of the compensator assembly 118 is shown in FIG. 12. The figure is a front end view and reveals that a square plate 162 is employed in lieu of the rectangular plate 122. The two bearing plates for the springs are hidden from view but are also of square configuration rather than rectangular. Other parts are identical to those previously described and are identified with like reference numerals with the addition of the "a" notation. It may be appreciated that the square configuration of the plates enables the assembly to accommodate five coil springs 136a arranged on the central rod 124a and four shorter rods 134a located at the corners of a square pattern. This provides a symmetrical cluster of springs and illustrates the adaptability of the design to various numbers of springs in a symmetrical arrangement depending upon the required force range. (For example, four springs could be employed in a triangular cluster, seven springs in a hexagonal cluster, etc.) Also, only a single center spring 136 may be used by removing the outer springs 136, or a two-spring configuration may be employed by omitting the center spring 136.

OPERATION

As best illustrated in FIG. 4, the compensator assembly 118 provides a link between the lower end 130 of lever 132 and the upper end (plates 114) of the elbow member 112. If this link were rigid, the tongue 92 would be held in a fixed position and could not swing about the transverse axis defined by the pivot pins 106.

The elevation of the frame 20, 22 of the implement relative to the transport wheels 42, 46 and 52 is set by the hydraulic piston and cylinder assembly 62 in the usual manner. The elevation of the frame, of course, determines the soil depths at which the discs of the implement will operate. As the frame is selectively raised or lowered, it is necessary to adjust the normal operative position of the tongue 92 so that its nose will remain at the draw bar height of the tractor. This is accomplished by the operating rod 150 which causes lever 132 to pivot about fulcrum 156, thereby shifting the compensator assembly 118 generally forwardly or rearwardly to, in turn, swing the tongue 92 about pivot pins 106. However, once the frame elevation is set, the rockshafts 38 and 48 are held stationary by the hydraulic mechanism and the lever 132, in effect, then serves as a coupling member to anchor the rear end of the compensator assembly 118 to the frame of the implement.

The size of the springs 136 and the amount of preloading is governed by the particular implement with which the compensator is to be employed. This would normally be set at the factory during fabrication and is facilitated by the nuts 144 and 146. Note in FIG. 7 that, after assembly of the compensator unit, cross-pins 164 are used to lock the three nuts in place. Thereafter, rotation of nut 144 (which may be done in the field with a wrench) causes the entire central rod 124 to rotate to change the distance between the front trunnions 116 and the rear trunnions 128. Accordingly, the operator can make field adjustments to set the length of the link for a particular tractor drawbar height.

The operation of the compensator assembly 118 is best understood by considering the two primary components of the unit which are under the bias of the partially compressed springs 136. One component may be regarded as the central guide rod 124 and its nut 144 and collar 148. The other component includes the sleeve 120, plate 122, the shorter guide rods 134, and the collars 140 and nuts 146. Were it not for the springs 136 and bearing plates 138, these two components would be freely movable relative to each other longitudinally of the assembly 118 with the sleeve 120 being axially shiftable on the central rod 124. However, the presence of the springs 136 and bearing plates 138 prohibits such movement except when the applied force is of sufficient magnitude to overcome the spring pressure.

The three springs 136 (or five springs 136a in FIG. 12) have parallel lines of action and yieldably hold the parts of the assembly in the normal positions illustrated. However, an upward force on tongue 92 of sufficient magnitude swings the tongue structure in a counterclockwise direction about pivot pins 106 as viewed in FIG. 4, thereby forcing the upper end of elbow member 112 in a generally rearward direction. This forces rods 134 axially to the left as viewed in FIG. 7 and likewise shifts the right bearing plate 138 due to engagement by the collars 140 with the result that the springs 136 are further compressed. At this time, a gap exists between the nuts 146 and the left bearing plate 138, and between the right bearing plate 138 and the collar 148 on central rod 124. Similarly, a force pushing the tongue 92 down pulls rods 134 to the right, thereby shifting the left bearing plate 138 to the right and compressing the springs 136. In this condition of increased compression, the integral collar 142 on the left plate 138 separates from the nut 144 but the right plate 138 is held by the collar 148 on central rod 124. It may be appreciated, therefore, that the three springs 136 act in unison and that the bias of all springs must be overcome by a force acting in either direction.

As discussed earlier in this specification, a compensator of this general type allows the position of the tongue to change only when the tractor and implement traverse uneven ground. The number, size and pre-loading of the springs 136 are pre-selected to maintain the link of fixed length during operation on even ground. As previously discussed, the reaction forces against the discs or other tillage tolls produced by the resistance of the soil are desirably transmitted to the tractor drawbar, and the link is lengthened or shortened only when necessitated by irregularities in the terrain which, without compensation, would cause the soil depths of the tools to vary appreciably.

To compensate for the irregularity produced by the furrow 76, the center transport wheels 46 are easily independently adjusted by the turnbuckles 86 to increase the effective length of each of the legs 44 by swinging its shank section 80 forwardly thereby moving the center wheels 46 down and angularly ahead of the outer wheels 42 and 52. This also assists in producing even work, and assures that the implement frame will be supported by the wheels in a stable transverse attitude.

Having thus described the invention, what is claimed as new and desired to be secured by Letters Patent is:

1. In an implement having soil-engaging tools supported beneath a frame from which a tongue extends for connecting the implement to a tractor, the tongue being pivoted on the frame about a transverse horizontal axis, a counterpoise connection between the tongue and the frame for yieldably holding the tongue in a normal operative position and permitting the tongue to self-adjust when uneven terrain is traversed, said connection comprising:

- a compensator assembly presenting a link having opposed ends,
- means securing said ends to said tongue and said frame respectively,
- said ends being normally spaced apart a distance which is preselected to cause said assembly to hold said tongue in its normal position, and said assembly having a pair of components movable relative to each other in directions to vary the spacing between said ends to lengthen or shorten the link and thereby permit the position of the tongue to change,
- one of said components including a central guide rod having an end portion presenting one of said ends of the link,
- the other of said components including a sleeve telescoped over said central rod and presenting the other of said ends of the link, outboard guide rods spaced from said central rod and extending in general parallelism therewith, and means extending transversely from said sleeve and rigidly securing said outboard rods thereto,
- said assembly being provided with a pair of spaced bearing plates carried by said rods and shiftable thereon longitudinally thereof, and a plurality of compressible spring devices telescoped over corresponding central and outboard rods in compression between said members for yieldably resisting movement of said components in either of said directions and biasing said members toward normal, spaced-apart positions corresponding to said preselected distance,
- said spring devices preventing relative movement of the tongue and frame about said axis under the reaction forces against the tools produced by the resistance of the soil, but being sufficiently yieldable to permit the tongue and frame to undergo said relative movement to change the position of the tongue in response to irregularities in the terrain along the path of travel of the tractor and implement, and
- said central and outboard rods having means thereon engaging said members to shift the same toward each other along said rods and further compress said devices upon movement of the components in either of said directions.

2. In an implement having soil-engaging tools supported beneath a wheeled frame from which a tongue extends for connecting the implement to a tractor, and a mechanism for selectively raising and lowering the frame relative to the wheels thereof to set the soil depths of the tools, the tongue being pivoted on the frame about a transverse horizontal axis, a counterpoise connection between the tongue and the frame for yieldably holding the tongue in a normal operative position and permitting the tongue to self-adjust when uneven terrain is traversed, said connection comprising:

- a compensator assembly presenting a link having opposed, front and rear ends,
- means pivotally attaching said front end to said tongue,
- means securing said rear end to said frame,
- said ends being normally spaced apart a distance which is preselected to cause said assembly to hold said tongue in its normal position, and said assembly having a pair of components movable relative to each other in directions to vary the spacing between said ends to lengthen or shorten the link and thereby permit the position of the tongue to change,
- one of said components including a central guide rod having an end portion presenting one of said ends of the link,
- the other of said components including a sleeve telescoped over said central rod and presenting the other of said ends of the link, outboard guide rods spaced from said central rod and extending in general parallelism therewith, and means extending transversely from said sleeve and rigidly securing said outboard rods thereto,
- said assembly being provided with a pair of spaced bearing plates carried by said rods and shiftable thereon longitudinally thereof, and a plurality of compressible spring devices telescoped over corresponding central and outboard rods in compression between said members for yieldably resisting movement of said components in either of said directions and biasing said members toward normal, spaced-apart positions corresponding to said preselected distance,
- said spring devices preventing relative movement of the tongue and frame about said axis under the reaction forces against the tools produced by the resistance of the soil, but being sufficiently yieldable to permit the tongue and frame to undergo said relative movement to change the position of the tongue in response to irregularities in the terrain along the path of travel of the tractor and implement,
- said central and outboard rods having means thereon engaging said members to shift the same toward each other along said rods and further compress said devices upon movement of the components in either of said directions, and
- said securing means including a coupling member pivotally secured to said frame and said rear end, and operating means interconnecting said mechanism and said coupling member for swinging the latter in response to said raising or lowering of the frame to adjust the normal operative position of the tongue in accordance with the selected frame elevation.

3. The counterpoise connection as claimed in claim 1, wherein one of said spring devices is telescoped over said central rod and the other spring devices are telescoped over corresponding outboard rods and laterally spaced from said one device to provide a symmetrical cluster of said devices, whereby said assembly is adaptable to various force ranges by the choice of the number of spring devices and outboard rods used to form said cluster.

4. The counterpoise connection as claimed in claim 2, wherein one of said spring devices is telescoped over said central rod and the other spring devices are telescoped over corresponding outboard rods and laterally spaced from said one device to provide a symmetrical cluster of said devices, whereby said assembly is adaptable to various force ranges by the choice of the number of spring devices and outboard rods used to form said cluster.

* * * * *